Figure 1:
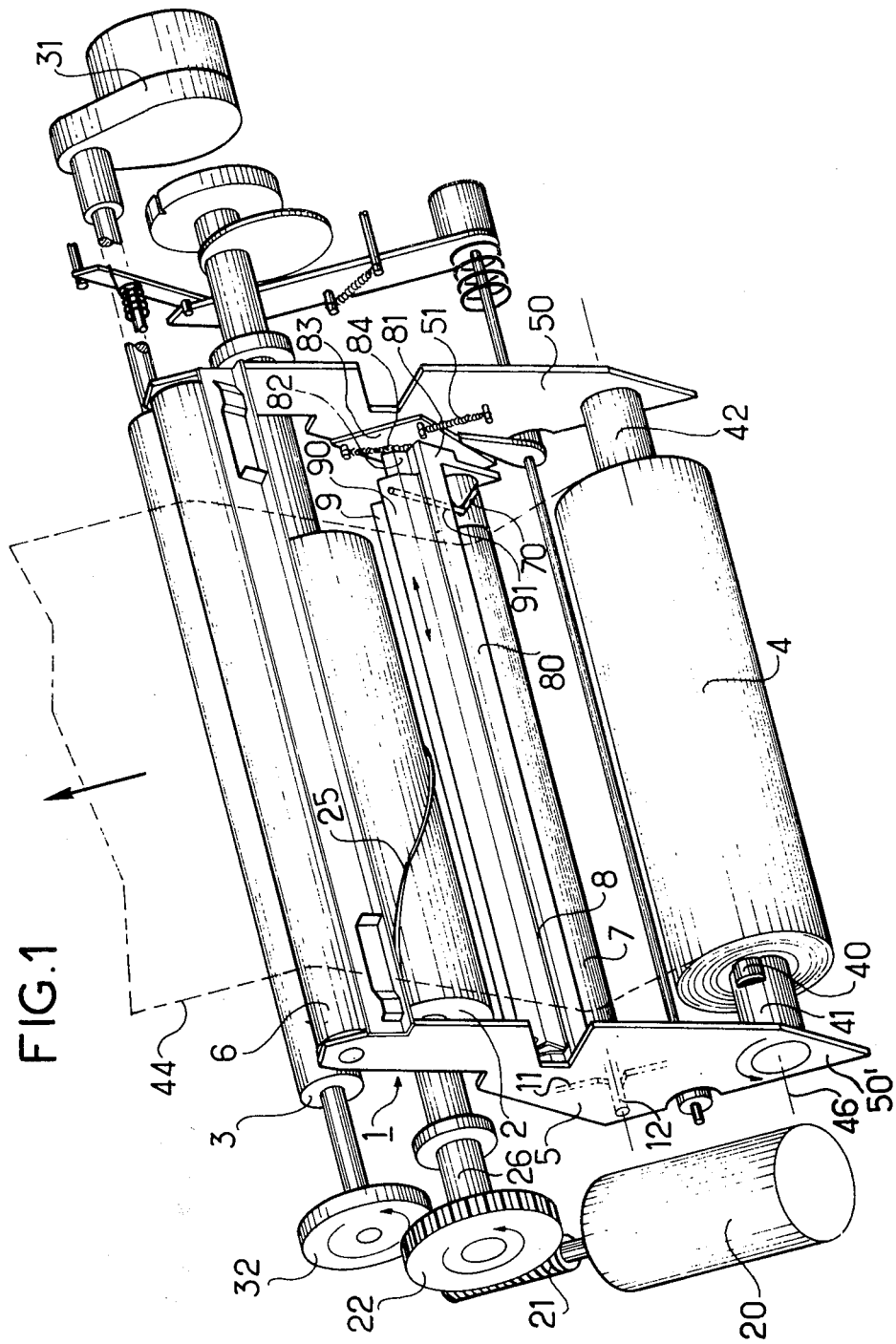

United States Patent
Mary et al.

[11] 3,956,754
[45] May 11, 1976

[54] FACSIMILE APPARATUS WITH RECIPROCATING PRINTING BAR

[75] Inventors: Jacques Mary, Bagneux; Pierre Merillou, Grigny, both of France

[73] Assignee: Compagnie Industrielle des Telecommunications Cit-Alcatel, France

[22] Filed: July 30, 1974

[21] Appl. No.: 493,102

[30] Foreign Application Priority Data
Aug. 6, 1973  France .............................. 73.28668

[52] U.S. Cl. .............................. 346/74 E; 346/101
[51] Int. Cl.² .................... G01D 15/06; H04N 1/16
[58] Field of Search ............ 178/5, 6.6 A; 346/74 E, 346/74 ES, 74 R, 145, 101

[56] References Cited
UNITED STATES PATENTS

| | | | |
|---|---|---|---|
| 2,776,181 | 1/1957 | Alden | 346/74 EL |
| 2,825,622 | 3/1958 | Cohen | 346/74 EL |
| 3,546,707 | 12/1970 | Dixon | 346/74 EL |
| 3,638,237 | 1/1972 | Alden | 346/74 EL |

*Primary Examiner*—Bernard Konick
*Assistant Examiner*—Jay P. Lucas
*Attorney, Agent, or Firm*—Craig & Antonelli

[57] ABSTRACT

In a facsimile receiver access to the paper supply roll and other internal elements is facilitated by supporting the guide roller, printing bar and presser-roller on a chassis that is pivotable around the axis of the supply roll from a first position in which the paper web is held against the guide roller between the printing drum and the printing bar and between the drive roller and presser-roller, and a second position wherein the guide roller and the pressure-roller as well as the printing bar are positioned remote from said drum and said supply roll.

8 Claims, 2 Drawing Figures

FACSIMILE APPARATUS WITH RECIPROCATING PRINTING BAR

BACKGROUND OF THE INVENTION

This invention relates to a facsimile receiver, and more particularly to an apparatus of the kind having a continuous helix on a printing drum.

In this type of apparatus, the printing on electrolytic paper results from the passage of current through the paper from a printing bar disposed adjacent the paper. The passage of the current is obtained by the scanning of the paper using a helical conductor supported by a rotating drum which applies the paper against the printing bar. This type of apparatus requires periodic replacement of the paper roller and the printing bar, which has the disadvantage that it involves the dismantling of a considerable part of the apparatus.

According to the present invention there is provided a facsimile receiver comprising a rotatable drum carrying a printing helix, a printing bar, a support for the printing bar, a return lever mounted on a control shaft parallel to the drum for pivoting the support from a rest position away from the drum to an operative position where the printing bar bears on the helix, a cam mounted on the drum shaft, a control lever mounted on the control shaft and pivoting with this shaft under the action of the cam, a locking finger arranged in the plane of the cam and locking the control lever when it has pivoted under the action of the cam, an electromagnet for moving the control lever from the locking position in the plane of the cam to an unlocking position outside the plane of the cam, a first spring pivoting the control lever in the opposite direction after unlocking, and a second spring returning the control lever to the plane of the cam after unlocking.

Preferably the axis of articulation of the chassis lies along the axis of the paper roller. In addition, in order to reduce the wear on the printing bar, the support for the printing bar carries a sliding part which is itself provided with a slider having one end driven by the rotation of the guide roller in a groove formed as a closed loop in its periphery.

Figure 2:
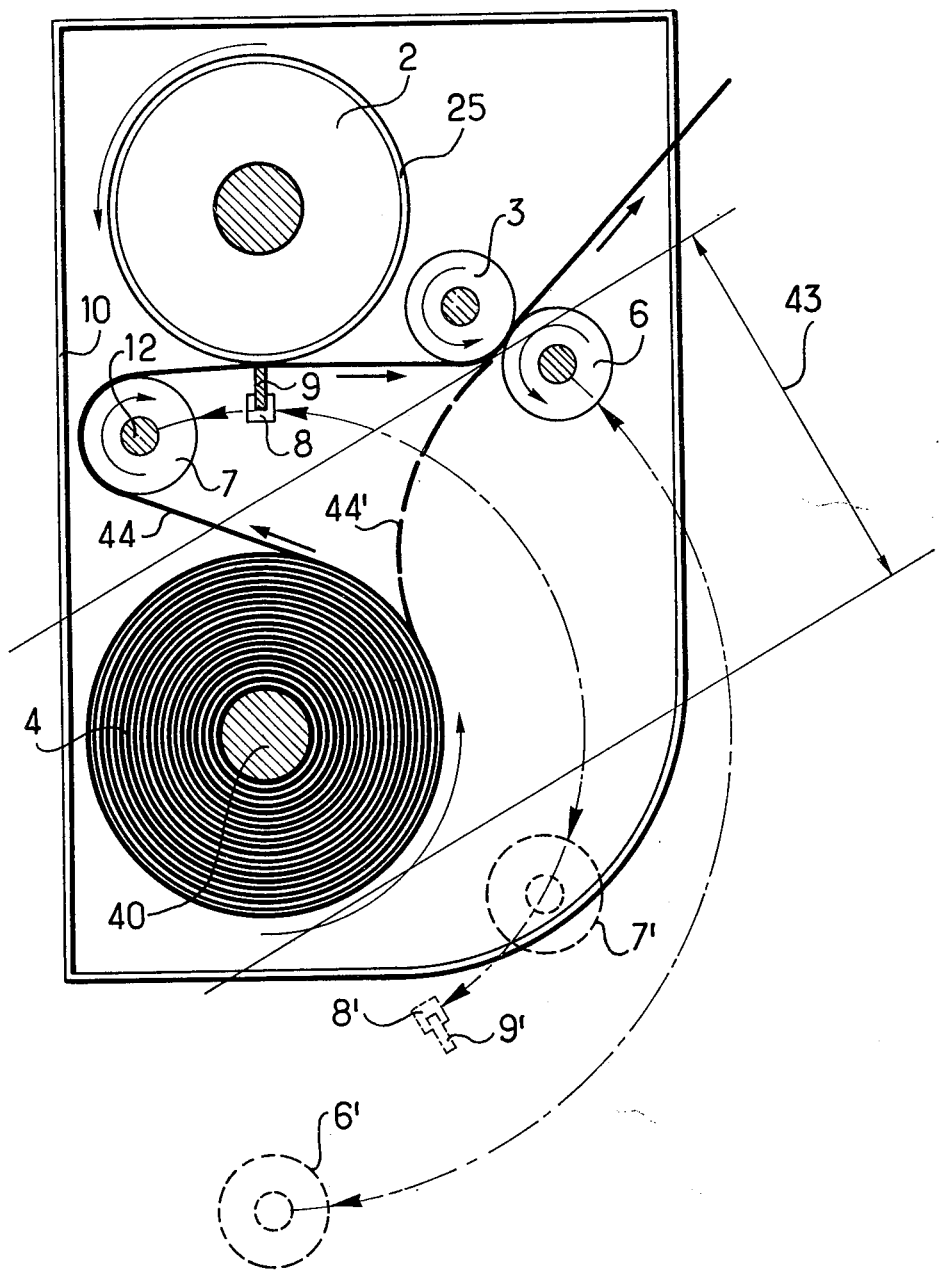

The invention will now be described in more detail, by way of example, only, with reference to the accompanying drawings, in which:

FIG. 1 is a perspective view of a portion of a facsimile receiver embodying the present invention; and FIG. 2 is a view in cross section of the apparatus shown in FIG. 1.

PREFERRED EMBODIMENT OF THE INVENTION

The facsimile receiver has a mechanical module 1 normally contained in a casing 10 which is shown only in FIG. 2. The module comprises a drumm 2, a drive roller 3, a supply roller 4 and a chassis 5.

The drum 2 is arranged between the drive roller 3 and the supply roller 4. It is provided with a drive device constituted by a motor 20 carrying a worm screw 21 cooperating with a tangential toothed wheel 22 keyed on shaft 26 of the drum 2. A conducting helix is arranged over the surface of the drum 2. The drive roller 3 is provided with a reduction motor 31 and a manual hand wheel 32.

The supply roller rests by means of its central portion 40 on two open supports carried by the chassis 5 and forming bearings 41 and 42 which have a common axis 46 with a core 40. One of the bearings is provided with a braking device not shown in the figures. The axes of the drum 2, the supply roller 4, and the drive roller 3, are parallel and mounted on the framework of the device, such as the casing 10.

The chassis 5 is formed by two sidewalls 50 and 50' between which are arranged, parallel to the axis of the drum, a presser-roller 6, a return roller 7, and a support 8 on which is fixed a printing bar 9. The chassis assembly is articulated on the two bearings 41 and 42 around the axis of the roller 4. Two V-shaped pieces 11 are mounted on the framework of the module 1, such as on the sidewalls 50 and 50', and are intended to receive the shaft 12 of the roller 7.

The support 8 comprises a yoke 80 having side portions 81 articulated about the axis 12 of the return roller 7. Only one of the side portions 81 is visible in FIG. 2. The base of the yoke 80 carries a slideway 82 which carries a sliding part 90 on which is fixed the printing bar 9. The sliding part is provided with a slider 91. The side portion 81 is connected by a regulating spring 84 to a cheek 83 arranged between the flank 81 and the sidewall 50. The cheek 83 is itself articulated about the axis 12 of the return roller 7 and connected to the sidewall 50 by a disengagement spring 51. The regulating spring 84 biases the yoke 80 towards the drum 2 along an angular course about the axis of the roller 7 by about 7° to 8°. The spring 51, on the contrary, biases the cheek 83 away from the drum 2 along an angular course about 15° around the axis 12 of the roller 7.

The chassis 5 can occupy either a first position, called the working position, in which the printing bar is arranged adjacent the drum 2, while the presser-roller 6 is arranged adjacent the drive roller 3, or the chassis will also occupy a second position, called the disengaged position, where the printing bar is displaced away from the drum 2 and the presser-roller is displaced away from the drive roller 3. The axis 12 of the roller 7 rests in the two V-shaped pieces 11, thus ensuring parallelism between the roller 2 and the printing bar 9.

In the working position, shown in full lines in FIG. 2, the web of paper 44 leaves the supply roller 4 and passes against the guide roller 7, then between the printing bar 9 and the conducting helix 25, and finally between the drive roller 3 and the presser-roller 6. The web of paper 44 which is driven by the roller 3 is printed on by the passage of current coming from the transmitter of the facsimile with the aid of a system not part of this invention. The current crosses the paper by flowing from the printing bar 9 to the helix 25 which affects a periodic scanning of the paper against the printing bar, when the drum is driven in rotation by the motor 20.

The contact pressure of the printing bar 9 against the web of paper 44 and the helix 25 of the drum 2 is adjusted automatically according to the wear of the bar 9, owing to the action of springs 84 and 51.

The drive of the web of paper 44 by the roller 3 causes the rotation of the roller 7. This latter carries at one end the groove 70 formed in its periphery constituting a closed curve such as an elipse. This groove serves to guide the end of the slider 91 and make the sliding part 90 describe a reciprocating movement of which the amplitude corresponds to the projection of this curve on the geometric axis of the roller 7. Thanks to this reciprocating movement, the wear of the bar 90 due to the passage of current is distributed along its length without it having preferential and repetitive wear positions.

In the disengaged position shown diagrammatically in dotted lines in FIG. 2, the chassis 5 is pivoted about the axis of the supply roller 4. The members integral with the chassis occupy a new position. The presser-roller 6, the support 8, the printing bar 9 and the return roller 7 occupy the positions referenced respectively 6', 8', 9', and 7'. The web of paper 44 can then occupy the position shown at 44'.

It can be seen that, in this disengaged position, the accessibility to the supply roller for the replacement of paper or for maintenance is particularly easy and doesn't require dismantling of the chassis. An access corridor is effectively formed at 43 between the drive roller and the drum 2 on the one hand, and the return wheel pivoted on 7' on the other hand, as seen in FIG. 2. Besides, the printing bar 9 being remote from the drum 2, one can have access to it in order to proceed with maintenance or replace it.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. In a facsimile receiver having a frame carrying a drum provided with a printing helix, a supply roller for carrying a rolled web of paper and drive means including a drive roller for driving said paper; and a guide roller for guiding said web of paper between said drum and a printing bar; the improvement comprising a support carrying the printing bar; a presser-roller for pressing the paper web against the drive roller; a chassis carrying said support for said printing bar, said guide roller and said presser-roller; and means for pivotally mounting said chassis about an axis parallel to the axis of said drum between a first position in which the web of paper is held against said guide roller between the drum and the printing bar and between the drive roller and the presser-roller, and a second position wherein said guide roller and said presser-roller as well as said printing bar are positioned remote from said drum and said supply roller, said printing bar comprising a yoke and an elongated support member slideably mounted in said yoke for movement in the direction of the longitudinal axis thereof, said printing bar being carried by said elongated support member, and means responsive to rotation of said guide roller for reciprocating said elongated support member, said guide roller having a groove in the form of a closed loop in the surface thereof, and said means for reciprocating said elongated support member comprises a guide rod connected to said printing bar support and engaging said groove so as to reciprocate in the direction of the axis of said guide roller.

2. A facsimile receiver as defined in claim 1 wherein the pivot axis of said chassis is coincident with the axis of said supply roller.

3. A facsimile receiver as defined in claim 1 wherein said closed loop has the form of an ellipse.

4. A facsimilel receiver as defined in claim 1, wherein said means for reciprocating reciprocates said printing bar in the direction of the longitudinal axis thereof in synchronism with the rotation of said guide roller.

5. A facsimile receiver as defined in claim 1, further including means for pivotally mounting said printing bar support on said chassis for rotation about the axis of said guide roller.

6. A facsimile receiver as defined in claim 5, wherein said chassis is provided with a pair of V-shaped pieces acting as supports for said guide roller.

7. A facsimile receiver having a frame and a chassis, said frame carrying a drum provided with a printing helix, a supply roller for supplying a web of paper and a drive roller for driving said paper, said chassis being pivotally mounted about an axis parallel to the axis of said drum on said frame, said chassis carrying a presser-roller, printing bar and a guide roller for guiding said web of paper between said supply roller and said drum, said chassis being pivotable between a first pivot position wherein said printing bar cooperates with said drum and said drive roller cooperates with said presser-roller and a second pivot position wherein said guide roller and said presser-roller as well as said printing bar are positioned remotely from said drive roller and said drum, respectively, said printing bar being supported by an elongated support member slideably mounted in a yoke for movement in the direction of the longitudinal axis thereof, and means responsive to rotation of said guide roller for reciprocating said support member and said printing bar in parallel with the drum axis, said guide roller having a groove in the form of a closed loop in the surface thereof, and said means for reciprocating said support member and said printing bar includes a guide rod connected to said printing bar support member and engaging said groove so as to reciprocate in the direction of the axis of said guide roller.

8. A facsimile receiver as defined in claim 7, wherein said closed loop has the form of an ellipse.

* * * * *